United States Patent [19]

Solomon

[11] Patent Number: 4,976,857
[45] Date of Patent: Dec. 11, 1990

[54] FILTER ELEMENT AND FABRICATION METHODOLOGY

[75] Inventor: Donald F. Solomon, Hemet, Calif.

[73] Assignee: Newport Filters, Inc., Hemet, Calif.

[21] Appl. No.: 347,153

[22] Filed: May 3, 1989

[51] Int. Cl.$^5$ .............................................. B01D 29/07
[52] U.S. Cl. ................................... 210/493.5; 55/498; 55/521; 264/230; 264/DIG. 48
[58] Field of Search ......................... 55/497, 521, 498; 210/493.5; 264/230, DIG. 48

[56] References Cited

U.S. PATENT DOCUMENTS

| | | | |
|---|---|---|---|
| 2,973,833 | 3/1961 | Cook | 55/521 |
| 3,296,781 | 1/1967 | Schumann | 55/497 |
| 3,465,413 | 9/1969 | Rosaen et al. | 55/521 |
| 3,873,288 | 3/1975 | Wachter et al. | 55/497 |
| 4,169,059 | 9/1979 | Storms | 55/497 |

*Primary Examiner*—Ivars Cintins
*Attorney, Agent, or Firm*—Gordon L. Peterson; Loyal M. Hanson

[57] ABSTRACT

An improved filter assembly of the type having a housing with an inlet, an outlet, and a passage in fluid communication with the inlet and the outlet, a filter media disposed within the passage, and at least a first filter element mounted on the housing which includes a porous member extending transversely across the passage adjacent a first end portion of the filter media. The porous member is pleated in order to provide increased surface area for a given cross sectional area of the passage. The filter element includes an annular support member having an opening and a pleated porous member mounted on the support member so that a plurality of pleats extend transversely across the support member. A method of fabricating the filter element includes providing the annular support member, forming the pleated porous member, and mounting the porous member in a position extending across the opening. A circularly shaped portion is cut from a pleated sheet of porous material having at least two layers while the pleats are compressed. Then, the pleats are allowed to expand and all but one of the layers are removed from the circularly shaped portion, the remaining layer being retained as the pleated porous member.

9 Claims, 2 Drawing Sheets

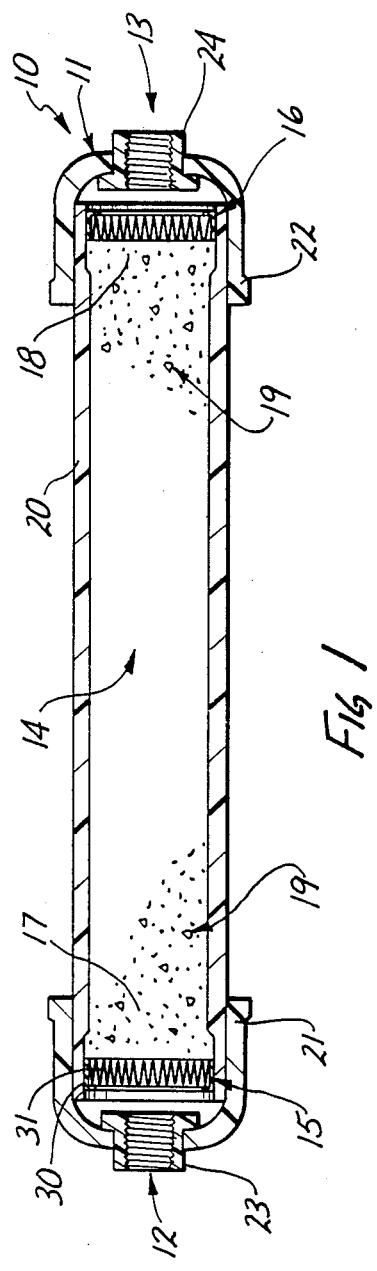
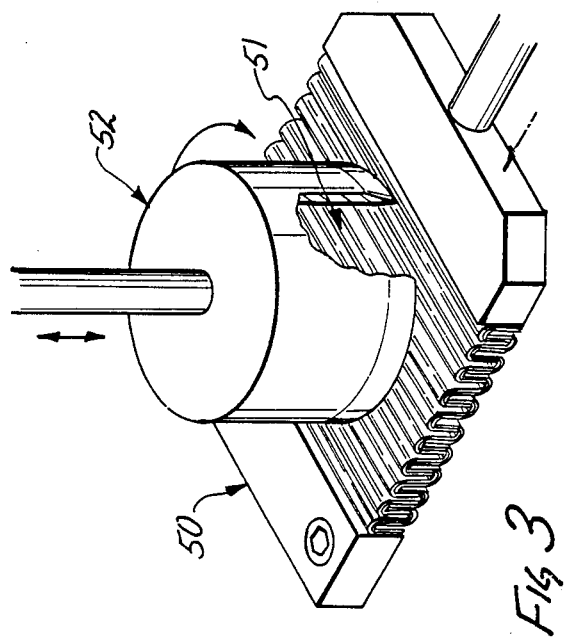
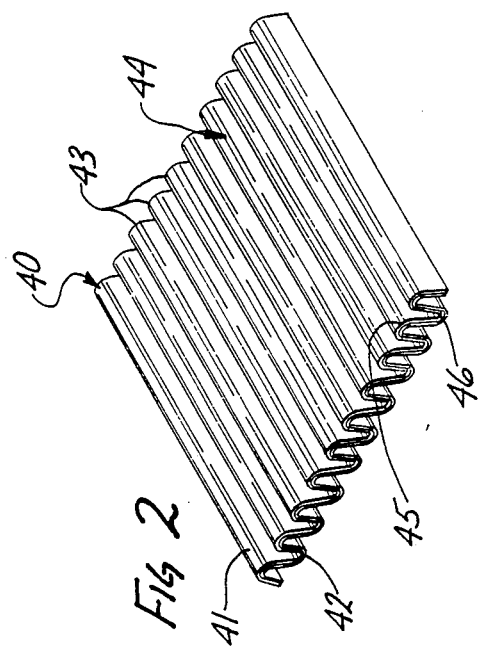

FILTER ELEMENT AND FABRICATION METHODOLOGY

BACKGROUND OF THE INVENTION

1. Technical Field

This invention relates generally to filters, and more particularly to an improved filter element, a filter assembly in which it is used, and the fabrication methodology employed.

2. Background Information

Some filter elements include a porous member mounted on a support structure so that the porous member can be supported transversely to a flow of fluid in order to trap particulate matter as the fluid flows through it. We can use the filter element alone for such purposes as filtering particulate matter from water as the water flows from the kitchen faucet or together with some other filter media in a filter assembly through which water is passed to improve its taste. In any case, the details of construction demand attention.

Consider, for example, a filter assembly configured for such applications as reverse osmosis water purification. The filter assembly may include a housing having an inlet, an outlet, and a passage arranged to communicate water from the inlet to the outlet, and the manufacturer might use an eight-inch length of one-inch inside diameter PVC tubing for the housing, with the interior of the tubing serving as the passage. Suitable structure such as molded end caps attached to opposite ends of the tubing enclose the interior and define the inlet and outlet.

The housing contains a filter media within the passage, such as granular activated carbon. The manufacturer mounts two filter elements on the housing at opposite ends of the activated carbon where they filter particulate matter and act as barriers to the activated carbon, confining it axially to a compact volume. Sandwiched between the two filter elements in that way, the activated carbon adsorbs substances from the water to improve its taste as the water flows through the filter assembly—flowing into the inlet, through the first filter element into the activated carbon, through the activated carbon to the second filter element, and thereafter through the second filter element and out of the outlet.

There are some problems with the filter elements, however. The porous member, for example, may take the form of a one-inch diameter disk that the manufacturer has cut from a sheet of suitable material, such as the spun bonded polypropolene commercially available under the tradename "TYPAR" or "REEMAY," and the support structure may take the form of a plastic ring to which the manufacturer has glued the periphery of the disk. So configured, the resulting filter element looks something like a flat, paper-thin diaphragm stretched across the plastic ring, a structure having certain drawbacks that need to be overcome.

Picture two such filter elements installed in an activated carbon filter assembly at opposite ends of a body of activated carbon. In those positions, the porous disk of each filter element should have a relatively large surface area in order to avoid a high pressure drop across the disk. But it should have a relatively small cross sectional area so that the activated carbon will have a favorable length to diameter ratio for filtering purposes.

Other considerations are just as conflicting. The diameter of the disk should be kept relatively small so that the disk does not deform or bulge axially because that can allow the activated carbon to loosen or shake with resulting voids or channeling. However, the diameter should be relatively large to offset the effect of those portions of the granular activated carbon called "fines," the fines including very fine particles which can abut the disk and result in a somewhat reduced effective filter element surface area. In addition, the glue at the periphery of the disk covers some of the actual filter element surface area so that it further reduces the effective filter element surface area.

Thus, it is desirable to have an improved filter element, assembly, and fabrication method that better alleviate those concerns.

SUMMARY OF THE INVENTION

This invention solves the problems outlined above by using a pleated porous member, the pleats increasing the surface area of the filter element without increasing the cross sectional area.

Thus, the manufacturer can maintain a favorable length to diameter ratio despite the greater surface area needed to offset the effect of fines and provide a lower pressure drop across the filter element. The increased surface area of the filter element increases the useful life of the filter element as well because the enlarged surface area can trap more particulates before becoming clogged to an extent that it can no longer be used. In addition, fabrication can proceed by mounting the pleated porous member without using surface area reducing glue. Furthermore, the pleats provide a stronger, corrugated configuration that resists bulging.

Generally, a filter element constructed according to the invention includes a circular porous member and an annular support member. The support member has an opening, the porous member is mounted on the support member in a position extending across the opening, and the porous member is pleated to provide a plurality of pleats extending transversely across the opening in order to provide increased surface area for a given cross sectional area of the opening.

Accordingly, an improved filter assembly constructed according to the invention includes a housing having an inlet, an outlet, and a passage in fluid communication with the inlet and the outlet. A filter media is disposed within the passage and at least a first filter element is mounted on the housing. The first filter element includes a porous member extending transversely across the passage adjacent a first end portion of the filter media. One improvement of this invention comprises the porous member being pleated in order to provide increased surface area for a given cross sectional area of the passage.

In line with the above, a method of fabricating a filter element according to the invention includes the steps of providing an annular support member having an opening, forming a pleated porous member, and mounting the porous member on the annular support member in a position extending across the opening. The pleated porous member may be formed by providing a pleated sheet of porous material having at least two layers, compressing the pleats, and cutting a circularly shaped portion from the pleated sheet of porous material while the pleats are compressed. Then, the pleats are allowed to expand and all but one of the layers are removed from the circularly shaped portion, and the remaining layer is used as the pleated porous member.

In that regard, the circularly shaped portion is cut to have an outside diameter when the pleats are compressed that is slightly smaller than the inside diameter of the annular support member, and the mounting of the porous member on the annular support member is accomplished by compressing the pleats of the porous member, inserting the porous member in the opening in the annular support member, and allowing the pleats to expand. If desired, the annular support member may be configured to include a peripheral wall and a shoulder projecting inwardly of the peripheral wall so that the porous member can seat against the shoulder and thereby be retained in position without using glue.

Although it is known to use porous members having pleats that extend transversely to a flow of fluid (in air filters, for example), such prior art porous members have been rectangular, mounted in a rectangular frame. That arrangement results in a tendency for the pleats to sprawl apart or spread at various locations on the porous member. To overcome that tendency, such prior art porous members have been configured to include ribs or adhesive or other spacing means that resist the tendency of the pleats to spread apart, thereby helping to maintain a uniform distance between the pleats.

This invention overcomes the need for the porous member to include ribs or other spacing means by using an annular support member and a circular porous member. When the pleats of the circular porous member expand within the annular support member, as subsequently described in the specification, each pleat fits within the annular support member along a respective one of parallel, spaced apart chords of the annular support member. That results in adjacent ones of the pleats being equally spaced apart, all the pleats abutting the annular support member in a way that resists the tendency for the pleats to spread apart.

The above mentioned and other objects and features of this invention and the manner of attaining them will become apparent, and the invention itself will be best understood, by reference to the following description taken in conjunction with the accompanying illustrative drawings.

BRIEF DESCRIPTION OF THE DRAWINGS

FIG. 1 of the drawings is cross sectional view of a filter assembly constructed according to the invention;

FIGS. 2-5 illustrate various steps employed in fabricating the filter elements in the filter assembly;

DESCRIPTION OF THE PREFERRED EMBODIMENTS

Figure 4:
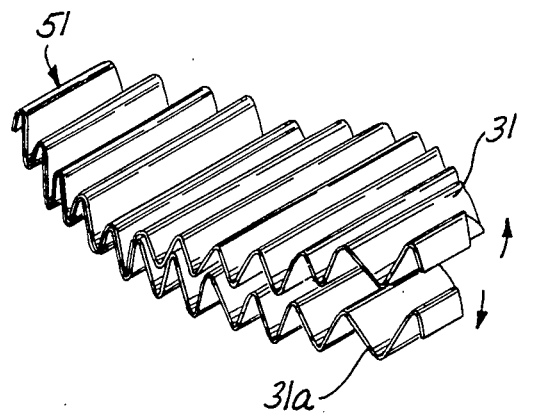

Referring now to the drawings, there is shown a filter assembly 10 constructed according to the invention (FIG. 1). Generally, the filter assembly 10 includes a housing 11 having an inlet 12, an outlet 13 and a passage 14 in fluid communication with the inlet 12 and the outlet 13. The inlet 12 communicates fluid from a separate source (not shown) to the housing 11 and the outlet 13 communicates the fluid from the housing 11 to its destination (not shown).

The filter assembly 10 also includes two filter elements, first filter element 15 and second filter element 16. They are mounted in the housing 11 at respective ones of a first end portion 17 and a second end portion 18 of a filter media 19 where they trap particulate matter contained in fluid flowing through the housing 11 while confining the filter media 19 axially within the passage 14. In other words, the filter media 19 is disposed within the passage 14 where it extends fully between the first and second filter elements 15 and 16, the first and second filter elements 15 and 16 acting as barriers that prevent the filter media 19 from moving beyond the first filter element 15 toward the inlet 12 or beyond the second filter element 16 toward the outlet 13. Thus, the first and second filter elements 15 and 16 serve as barrier means for axially confining the filter media 19 within the passage 14. Of course, they need not serve this added function within the broader inventive concepts disclosed.

Fluid, such as water, flows into the inlet 12, through the first filter element 15 into the filter media 19, through the filter media 19 to the second filter element 16, and thereafter through the second filter element 16 and out of the outlet 13. As the water flows through the housing in that way, it is filtered of particulate matter by the first and second filter elements 15 and 16 while the filter media 19 adsorbs substances from the water in a known manner for purposes of improving its taste.

Considering each of those elements in further detail, the housing 11 may, for example, be composed of an eight-inch (20.32 cm) length of one-inch (2.54 cm) inside diameter PVC pipe (a pipe 20 in FIG. 1) to which mating end caps 21 and 22 are affixed by known means such as bonding. First and second fittings 23 and 24 mounted on respective ones of the end caps 21 and 22 define the inlet 12 and the outlet 13 while serving as connectors by which conduits or lines (not shown) can be connected to the filter assembly 10 for purposes of conveying a fluid, such as water, into the inlet 12 and out of the outlet 13.

The filter media 19 may take the form of a granular activated carbon, for example, so that the filter assembly 10 may be used as a post filter in a reverse osmosis water purification system (i.e., a filter on the downstream side of the reverse osmosis membrane). Of course, the filter assembly 10 may be otherwise configured within the inventive concepts disclosed and be used for other than reverse osmosis water purification purposes.

Figure 6:
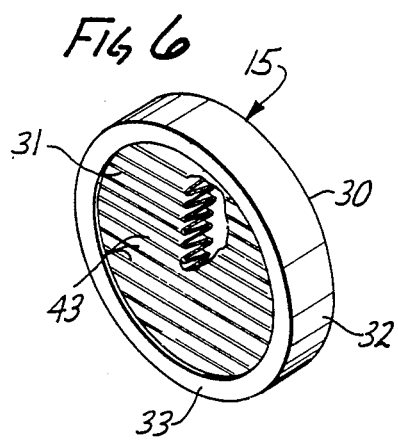
FIG. 6 is a perspective view of one of the filter elements.
Figure 7:
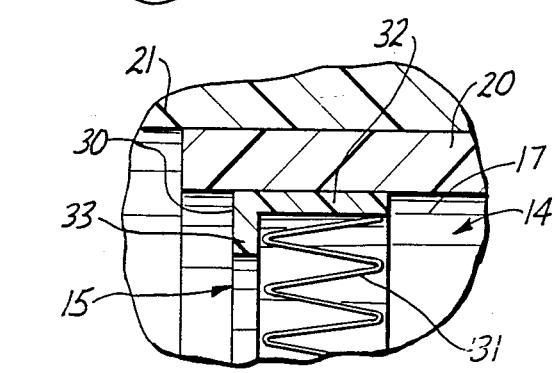
FIG. 7 is an enlarged cross sectional view of a portion of the filter assembly showing details of the ring used in one of the filter elements to support the porous member.

Concerning the first and second filter elements 15 and 16, they are generally similar in construction so that only the first filter element 15 is described in further detail. Although various configurations can be utilized within the broader inventive concepts disclosed, the illustrated filter element 15 includes an annular support member or ring 30 on which is mounted a porous member 31 (FIGS. 1, 6, and 7). Mounted within the housing 11 where it may be affixed to the pipe 20 by suitable means such as bonding, the ring 30 supports the porous member 31 so that the porous member 31 is disposed transversely across the passage 14. In other words, water flowing through the housing 11 must first pass through the porous member 31 to reach the filter media 19.

The ring 30 may be fabricated by known techniques from a resiliently deformable material such as a thermoplastic material so that it can be deformed during fabrication of the filter element 15 as subsequently described.

The ring 30 is illustrated as circular in this embodiment, but of course, it could take some form other than circular within the broader inventive concepts disclosed, but the annular shape fits the interior of the pipe 20. The ring 30 includes a peripheral wall 32 having an outside diameter slightly smaller than the inside diameter of the pipe 20 so that it can be bonded in place (but the outside diameter could, in the alternative, be slightly larger than the inside diameter of the pipe 20, and the ring 30 pressed in placed). It also has an inside diameter substantially equal to the outside diameter of the porous member 31 (when the porous member 31 is mounted within the ring as subsequently described) and an axial width slightly larger than the thickness of the porous member 31.

Figure 5:
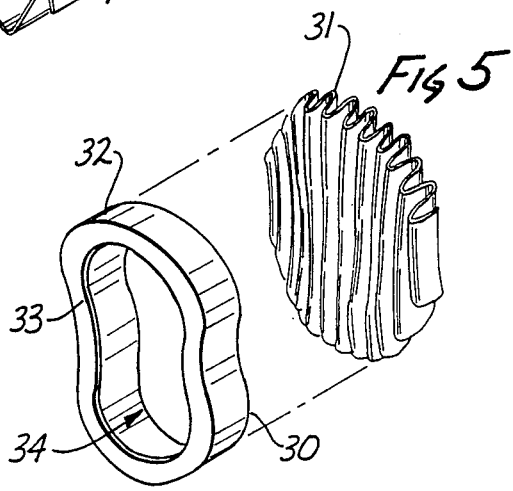

A radially inwardly extending portion of the ring 30, or shoulder 33 (FIG. 7), provides a structure against which the porous member 31 abuts or seats to prevent axial movement of the porous member 31 relative to the ring 30. When installed in the pipe 20 as shown in FIG. 1, the porous member 31 is prevented by the shoulder 33 from moving relative to the pipe 20 in a direction away from the first end portion 17 of the filter media 19, while movement of the porous member 31 in the opposite direction (toward the filter media 19) is prevented by the first end portion 17 of the filter media 19. In other words, the shoulder 33 serves to secure the porous member 31 within the ring 30, in a position extending across an opening 34 defined by the ring 30 (FIG. 5). It also provides additional strength to the ring 30, thereby enhancing the ability of the filter element to contain the filter media 19.

Figure 8:
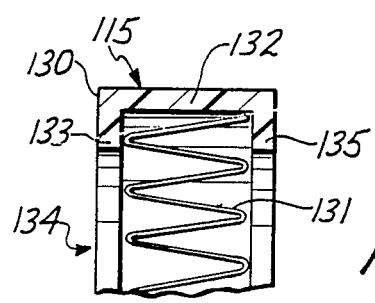
FIG. 8 is a cross sectional view of a second embodiment of a ring used in the filter elements.

A ring 130 that is configured a little differently from the ring 30 is used in a filter element 115 constructed according to the invention as shown in FIG. 8. The ring 130 is generally similar to the ring 30 so that only differences are described further. For convenience, reference numerals designating parts of the ring 130 are increased by one hundred over those designating similar parts of the ring 30.

Unlike the ring 30, the ring 130 includes a second radially inwardly extending portion, or shoulder 135. It prevents movement of the porous member in a direction away from the shoulder 133. This secures the porous member so that no filter media, glue, or other means is required to hold the porous member 131 in place. Thus, the filter element 115 is adapted for use apart from a filter media or other such structure. Even if the filter element 115 is intended for use in a filter assembly similar to the filter assembly 10, the second shoulder 135 serves to keep the porous member 131 in position before the filter element 115 is assembled with other components, during handling and/or shipping, for example. In that regard, the filter element 15 is not limited to use in a filter assembly having a filter media that abuts the porous member 31. It can be used elsewhere without axial movement of the porous member 31 relative to the ring 30 when the porous member 31 is glued to the ring 30 or when fluid flow is unidirectional through the opening 34 toward the shoulder 33.

Fabrication of the filter element 15 proceeds by providing the annular support member or ring 30 having the opening 34, forming the porous member 31, and mounting the porous member 31 on the ring 30 in a position extending across the opening 34.

The pleated porous member 31 may be formed by first providing a pleated sheet of porous material having at least two layers, such as the sheet 40 in FIG. 2 having a first layer 41 and a second layer 42. The sheet 40 may be composed of a suitable known porous material utilized for filtering purposes that can be pleated, such as the spun bonded polypropolene commercially available under the tradename "TYPAR" or "REEMAY." In that regard, "pleated" includes having a corrugated surface (i.e., one formed or shaped into what can be called wrinkles or folds or alternating ridges and grooves). Thus, the sheet 40 has a plurality of generally parallel pleats (i.e., a surface 44 formed or shaped into what can be called wrinkles or folds or alternating ridges 45 and grooves 46 as shown in FIG. 2).

Fabrication proceeds by compressing the pleats 43 as shown in FIG. 3 so that adjacent ones of the ridges 45 are closely proximate each another. This may be done in a known manner using a suitable jig 50. The method then proceeds by cutting a circularly shaped cutout portion 51 from the pleated sheet 40 while the pleats 43 are compressed. A circular cutting tool 52 may be used for that purpose.

Once the cutout portion 51 has been cut from the sheet 40 the pleats 43 are allowed to expand. The cutout portion 51 then assumes an elliptically shaped configuration as shown in FIG. 4, and the cutout portion 51 is separated into separate cutout layers, one being the pleated porous member 31 and the other being a similar porous member, designated in FIG. 4 as porous member 31a. Of course, a sheet 40 having more than two layers may be used with the result that more than two cutout portions are produced by the cutting step. Using more than one layer establishes a uniform width between adjacent ones of the pleats 43, and using more than two layers increases the distance.

Next, the pleats of the porous member 31 are again compressed as shown in FIG. 5. With the other layer (the porous member 31a) removed, the porous member 31 can be compressed into an elliptically shaped configuration having a minor axis sufficiently less than the inside diameter of the ring 30 to enable convenient installation of the porous member 31 into the ring 30. The ring 30 may be deformed slightly into a similar elliptical configuration as shown in FIG. 5 to facilitate installation. Then, both the ring 30 and the porous member 31 are allowed to expand to their circular shapes. If desired, an adhesive can be added between the ring 30 and the porous member 31 to more securely mount the porous member 31 with the result that it is more rigid.

Once the filter elements 15 and 16 are fabricated, they are mounted in the pipe 20 with the pleats 43 extending transversely across the passage 14 in order to form the filter assembly 10. This may be done by mounting the filter element 15 and the end cap 21, the filter element 15 being secured to the pipe 20 by suitable means such as bonding or pressing it in place. After the bonding agent cures, the filter media 19 is placed within the passage 14 adjacent the second end portion 18 of the filter media 19. If desired, the filter media 19 is compressed at this point by exerting pressure on it with the filter element 16. Then, the filter element 16 and end cap 22 are mounted while a flow of air passed through the filter assembly 10, from the inlet 12 to the outlet 13, in order to prevent glue vapors or other gaseous associated with the mounting of the filter element 16 and end cap 22 from contaminating the filter media 19.

Thus, this invention uses a pleated porous member to increase the surface area of the filter element without increasing the cross sectional area. The manufacturer can thereby maintain a favorable length to diameter ratio despite the greater surface area needed to offset the effect of fines and provide a lower pressure drop across the filter element. In addition, the increased surface area of the filter element increases the useful life of the filter element as well because the enlarged surface area can trap more particulates before becoming clogged to an extent that it can no longer be used. Furthermore, fabrication can proceed by mounting the pleated porous member without using surface area reducing glue, and the pleats provide a stronger, corrugated configuration that resists bulging.

Although an exemplary embodiment of the invention has been shown and described, many changes, modifications, and substitutions may be made by one having ordinary skill in the art without necessarily departing from the spirit and scope of the invention.

What is claimed is:

1. A filter element, comprising:
   a porous member having pleats;
   an annular support member;
   the support member having an opening, a peripheral wall and first and second axially spaced shoulders extending radially inwardly from the peripheral wall to define a radially inwardly opening cavity;
   the porous member being mounted on the support member in the cavity and with the pleats being between the first and second shoulders and with the porous member in a position extending across the opening; and
   the porous member being pleated to provide a plurality of pleats extending transversely across the opening in order to provide increased surface area for a given cross sectional area of the opening.

2. A filter element as defined in claim 1 wherein the annular support member is resiliently deformable.

3. A method of fabricating a filter element, comprising:
   providing an annular support member having an opening;
   forming a circularly shaped, pleated porous member;
   mounting the pleated porous member on the annular support member in a position extending across the opening; and
   said step of forming including providing a pleated sheet of porous material having at least two layers, compressing the pleats, cutting a circularly shaped portion from the pleated sheet of porous material while the pleats are compressed, allowing the pleats to expand, removing all but one of the layers from the circularly shaped portion, and using the remaining layer as the pleated porous member.

4. A method as recited in claim 3, wherein:
   the opening in the annular support member has a specified inside diameter; and
   the circularly shaped portion is cut to have an outside diameter when the pleats are compressed that is substantially equal to the specified inside diameter.

5. A method as recited in claim 3, wherein the step of mounting the porous member on the annular support member includes:
   compressing the pleats of the porous member;
   inserting the porous member in the opening in the annular support member; and
   allowing the pleats to expand.

6. A method as recited in claim 5, wherein the step of mounting the porous member further includes:
   deforming the annular support member to facilitate insertion of the porous member in the opening.

7. A method as recited in claim 5, wherein the step of mounting the porous member further includes:
   adhesively affixing the porous member to the annular support member.

8. A method of fabricating a filter element, comprising:
   providing a resiliently deformable annular support member having an opening;
   providing a pleated porous member sized and shaped to be received in said opening;
   compressing the porous member into an elliptical configuration;
   deforming the support member into an elliptical configuration;
   inserting the porous member in the opening in the annular support member while the porous member is compressed and the support member is deformed; and
   allowing the porous member and the support member to expand to mount the pleated porous member on the annular support member in a position extending across the opening.

9. A method as recited in claim 8 including adhesively affixing the porous member to the annular support member.

* * * * *